US006959441B2

(12) United States Patent
Moore

(10) Patent No.: US 6,959,441 B2
(45) Date of Patent: Oct. 25, 2005

(54) INTERCEPTING SYSTEM API CALLS

(75) Inventor: Richard John Moore, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 09/848,201

(22) Filed: May 3, 2001

(65) Prior Publication Data

US 2002/0019887 A1   Feb. 14, 2002

(30) Foreign Application Priority Data

May 9, 2000   (GB) .................................... 0011020

(51) Int. Cl.[7] ............................ G06F 3/00; G06F 9/44; G06F 9/46; G06F 13/00

(52) U.S. Cl. ....................................... 719/328; 719/310

(58) Field of Search .................... 709/310, 328–332, 709/227, 228; 345/798, 799; 719/310, 328–332

(56) References Cited

U.S. PATENT DOCUMENTS

| 6,272,519 B1 * | 8/2001 | Shearer et al. .............. 709/104 |
| 6,412,071 B1 * | 6/2002 | Hollander et al. .......... 713/200 |
| 6,463,583 B1 * | 10/2002 | Hammond .................. 717/162 |
| 6,529,985 B1 * | 3/2003 | Deianov et al. ............ 710/260 |

OTHER PUBLICATIONS

Pietrek, Learn System-Level Win32 Coding Techniques by Writing an API Spy Program, Microsoft System Journal, Dec. 1994, pp. 1-22.*

* cited by examiner

*Primary Examiner*—Thomas Lee
*Assistant Examiner*—Diem Cao
(74) *Attorney, Agent, or Firm*—William A. Kinnaman, Jr.

(57) ABSTRACT

A system for intercepting API calls in a virtual memory system comprises an activation module comprising an executable program and an interception module comprising a dynamic link library (DLL). The activation module is first executed at system initialization time, its prime purposes being to: parse user configuration information supplied in a configuration file; act as a daemon to launch and thus retain the interception module in shared memory; and hook system APIs to redirect calls via the interception module.

19 Claims, 5 Drawing Sheets

Unhook IM:

If SMP - take other processors offline
  Disable interrupts
  Avoid page faults:
    read from DOSCALL1 call instructions
    read from saved IM kernel ptrs
  Reset aliasses:
    copy saved kernel ptrs to DOSCALL1
    call instruction aliasses
  Enable interrupts
  If SMP - bring processors online.
  Reset Hooked flag
Terminate

INTERCEPTING SYSTEM API CALLS

BACKGROUND OF THE INVENTION

1. Field of the Invention

The present invention relates to a system for intercepting one or more application program interface (API) calls in a virtual memory environment.

2. Description of the Related Art

FIG. 1 shows the address space layout for a conventional virtual memory system of the type employed in, for example, OS/2 clients and uniprocessor servers prior to OS/2 Warp Version 4.5.

In such systems, virtual memory is divided into a system area occupying addresses between 4 GB and 512 MB, shared memory occupying addresses between 512 MB to 64 MB and private memory typically occupying the lowest 64 MB addresses. (The upper boundary of the private memory may expand above 64 MB at the expense of shared memory during normal system operation, although throughout this document the size of the private area will be stated as the initial size of 64 MB.) The shared area is subdivided into a global shared region (GSR) and a general purpose (GP) shared region. Virtual and physical memory is further divided into pages typically 4K in size. Each application process uses shared and private memory for its executable code and data and uses a set of page tables stored in the system area for mapping the virtual memory locations into physical memory and also for storing a process's access rights to memory. The mapping for pages in the GSR and the system area is common to all processes whereas the mapping for pages in private memory is potentially unique for each process. In the case of GP shared memory, its organization is common to all processes, however, only global data is mapped commonly; instance data is mapped uniquely for each process.

When the system switches a process context, the outgoing process's unique page table entries are saved in the system area while the incoming process's are refreshed from copies in the system area. On an Intel platform, Control Register 3 locates the page tables and the per process copies of the unique page mappings, which are used to update the page tables in a process context switch.

The kernel is loaded into the system area, access to which requires system privilege and special instructions to access kernel APIs. Most compilers are designed to generate code that accesses non-privileged APIs, thus all kernel APIs have to be front-ended by employing an API exposed by a shared memory module. In the case of OS/2 the module is called DOSCALL1.DLL. DOSCALL1 converts "near" type function calls to "far" type function calls required to access system kernel functions. When in memory, along with other code segments in shared memory, DOSCALL1 code segments are marked read-only and so their operation cannot easily be altered by application processes. Nonetheless, indirection of kernel APIs via DOSCALL1 affords the facility for moving function between the kernel and DOSCALL1 and other system modules without requiring any recompilation of application code.

Whereas older versions of OS/2 implement only low memory for application use, OS/2 Warp Version 3.0 SMP and Warp Version 4.5 introduce high memory regions for shared and private use by 32-bit applications only, FIG. 2. The total high memory space is limited to a maximum of 2.5 GB, which together with the 512 MB low memory (compatibility) region allows a 32-bit application to access 3 GB of virtual storage. However, it should be noted that access to high memory regions requires deliberate action on the part of applications. By default, memory allocations are made from the 512 MB compatibility region and this restriction of the application space (private and shared areas) ensures compatibility with older 16-bit applications.

Because versions prior to OS/2 Warp Version 3.0 SMP and Warp Version 4.5 only allow access to low memory regions, many applications continue to use that region even when executing on a later version that supports high memory. This can give rise to memory shortage problems, especially with long-running applications such as Lotus Domino that allocate their heaps in the low shared area.

A heap is a chunk of virtual memory, which is sub-allocated into sections or blocks of varying size. Lotus Domino allocates a heap in chunks of 1 MB to avoid the overhead of system memory allocation, which has not only a time overhead due to its generic nature, but also a granularity overhead, the granularity of system allocation usually being some multiple of a page size (4K). Problems arise with heap technologies when blocks of various sizes are sub-allocated from the same heap. Over time, this leads to fragmentation of the heap, the degree of which is dependent on the pattern of heap usage. In the case of Lotus Domino, wastage due to fragmentation was found to be approximately 30%. Once the heap is badly fragmented the maximum block size becomes severely limited. The only recourse when this happens is to allocate an additional heap. Lotus Domino does this to the extent that it will eventually expand the number of heaps to around 300 1 MB heaps—i.e. 300 MB of virtual memory in total. Lotus Domino makes its heap allocations in the low shared area for backwards compatibility with earlier versions of OS/2 and other operating systems that do not provide a high shared area. Under normal operating conditions, OS/2 allows Lotus Domino to acquire a maximum of approximately 250 MB (depending upon concurrent demand) from the low shared area and once this limit is reached unpredictable failures occur.

However, rather than recompile such applications, for example, it would be useful to intercept their heap allocations and redirect them from the low shared region to the high shared region.

Interception of APIs in itself is not a unique idea, in fact, it is well known on MS-DOS platforms to alter the address of an interrupt service routine in an interrupt vector table, have alternative code at the altered address process an interrupt request and then redirect the request to the original address in the interrupt vector table for further processing. Typically, however, such machines need to be rebooted if the interception is to be either disabled or reconfigured. In server systems or other systems, however, where availability is critical, it is not acceptable to require users to restart the system when interception characteristics are altered.

SUMMARY OF THE INVENTION

According to the present invention, there is provided a system for intercepting one or more application program interface (API) calls in a virtual memory environment comprising an activation module and an interception module. The activation module is adapted to load the interception module to occupy a location in a shared region of virtual memory as long as interception of the API calls is required; to redirect the one or more API calls by creating an alias to any page containing an entry point for an API call to be intercepted and to write the address of the interception module to the alias; and to provide to any instances of the interception module the original entry points for the one or more API calls. The interception module is adapted to selectively provide modified functionality for the intercepted API calls.

The invention overcomes the problem of how to alter the operation of code, such as DOSCALL1, which is usually loaded into read-only memory, without any operating system (OS) or application modification. The preferred embodiment operates in a generic manner that provides techniques for intercepting any 32-bit API, particularly, on an OS/2 system without modification to the system.

Preferably, the formal loading of the interception module by itself within a given process enables the module's instance and global data segments to be accessible in every instance of the interception module. This allows state information, for example, a pointer to configuration data and a spin lock for serializing access to such configuration data, stored, in particular, in the global data segment, to become available to all instances of the interception module in a way that minimizes the performance impact.

This also allows configuration data to be altered and for the operation of the interception module to be changed or even disabled without requiring the host system to be restarted.

A conventional way to facilitate such information sharing between instances of modules is to cause such modules to use a designated named shared memory. In the present case, however, this has many drawbacks, as it means that each instance of the interception module would need to make multiple calls, for example, DosGetNamedSharedMemory to get the address of the named shared memory and this in itself takes time and performance can suffer. Such an instance, because it presumably would not be formally loaded, would only be able to store data on the stack, and this may cause applications which run with very limited stack availability to crash, if such applications cause the interception module to execute recursively and iteratively push information to the stack. Finally, some API calls may expect the module making the API call to make a global or instance data segment available and so may crash if such a segment isn't used.

BRIEF DESCRIPTION OF THE DRAWINGS

An embodiment of the invention will now be described with reference to the accompanying drawings, in which.

DESCRIPTION OF THE PREFERRED EMBODIMENTS

Figure 1:
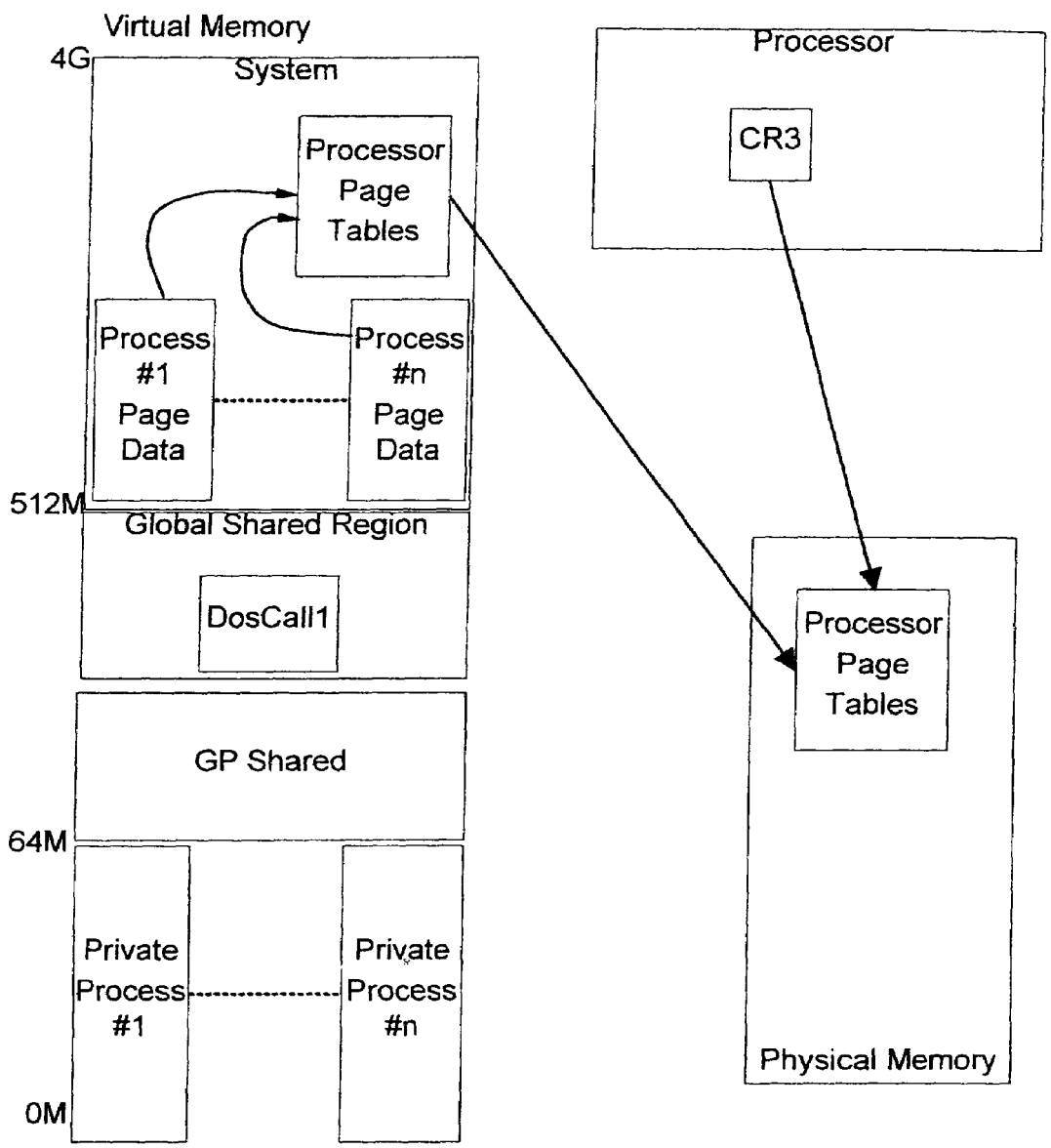
FIGS. 1 and 2 are diagrams of prior art virtual memory schema.
Figure 2:
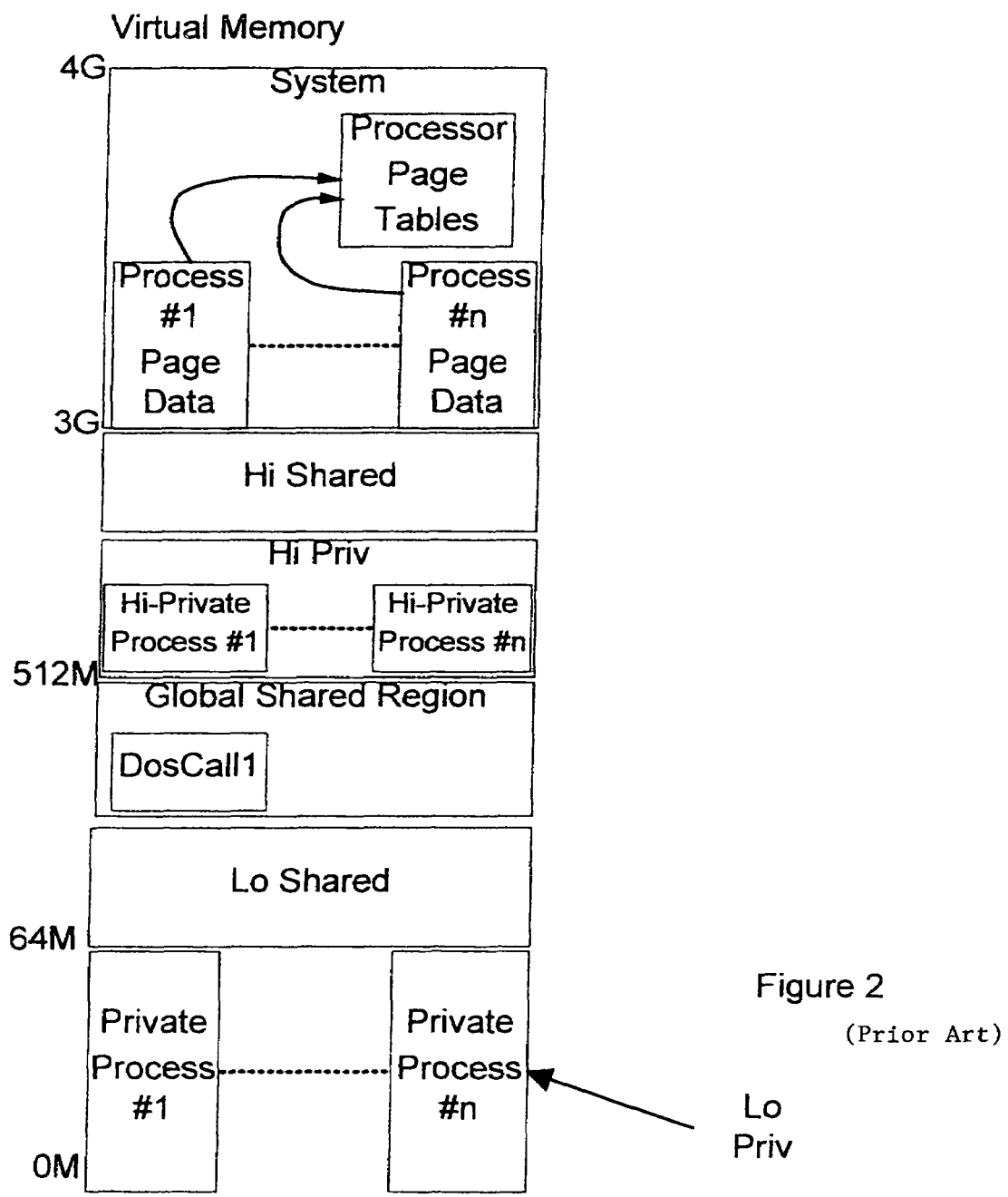
Figure 3:
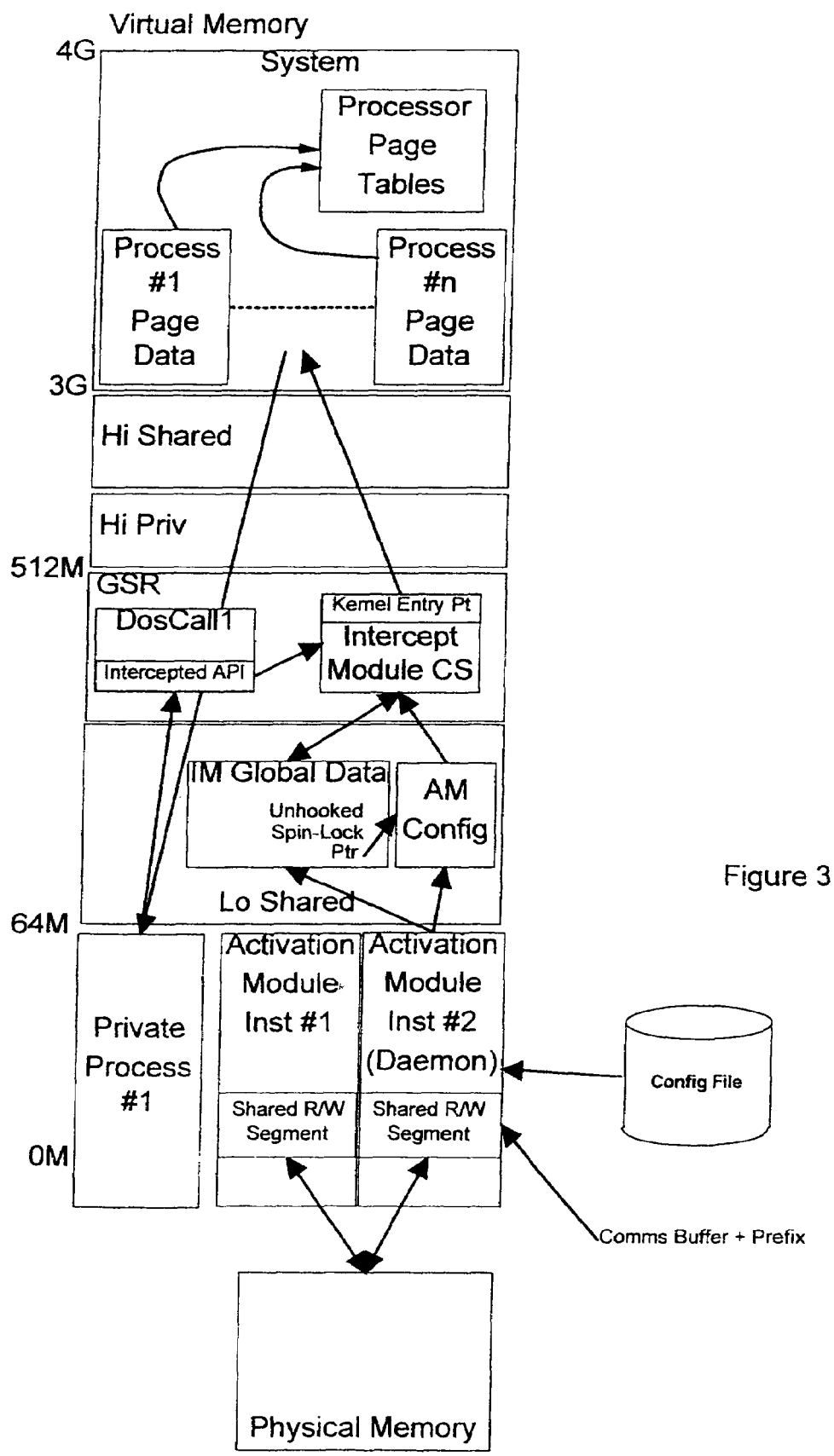
FIG. 3 illustrates an activation module (AM) and an interception module (IM) of the preferred embodiment operating with the virtual memory scheme of FIG. 2.

Referring now to FIG. 3, a preferred embodiment of the invention is described in relation to OS/2 Version 3.0 SMP and Version 4.5 systems running in an Intel-based environment. These operating systems implement a global shared region (GSR), that is, a region where page table entries are shared identically across all processes and in which the code segments of dynamic link libraries (DLLs) are loaded. These operating systems further provide a facility for creating read/write (R/W) virtual memory aliases to read-only memory objects.

The preferred embodiment employs an activation module comprising an executable program and an interception module comprising a dynamic link library (DLL). The activation module is first executed at system initialization time, its prime purposes being to: a) parse user configuration information supplied in a configuration file; b) act as a daemon to launch and thus retain the interception module in shared memory; and c) hook system APIs to redirect calls via the interception module.

Initial loading of the interception module at system initialization time is required in order to ensure the interception module is loaded into the global shared region and therefore addressable to all processes.

In the preferred embodiment, however, the activation module is used both to communicate messages to the user and at the same time remain loaded as a daemon to anchor the interception module. Thus, in the preferred embodiment a first instance of the activation module invokes a second instance of itself as a daemon and it is this second instance of the activation module which is responsible for parsing configuration information and hooking system APIs.

The reason for using a two-stage process is that, in order to communicate messages to the user, a process should preferably run in the system initialization screen group and so should be invoked using CALL=from CONFIG.SYS. However, CALL is synchronous and would halt further initialization until the program terminated. If the application which invoked the interception module terminated, then the interception module would also be removed from shared memory, hence the need to launch an instance of the activation module as a daemon process which in turn invokes the interception module.

A process is launched as a daemon by making it a detached process. That is a process with no parent and no screen group. It runs without any implied synchronicity or dependence on the launching process. In OS/2, this is done by specifying the EXEC_BACKGROUND execflag parameter with the DosExecPgm API used to create the new process.

It should be noted that applications such as the activation module can be set at compilation time either to load DLLs such as the interception module into memory as soon as the application is launched or only load DLLs into memory in response to a first invocation of a method exposed by the DLL. In the preferred embodiment, the activation module is set to do the former, and thus while the first instance of the activation module is not concerned with the functionality of the interception module, it causes the interception module to be read into memory. The code segment for this instance of interception module is used by the second instance of the activation module, so that even when the first instance of the activation module eventually terminates, the persistence of the second instance will cause the interception module to remain in virtual memory and in particular within the global shared region.

In order to illustrate the invention, the preferred embodiment is described in terms of an interception module which intercepts memory allocations made from a particular location by a particular module within a particular application and modifies the allocation request dynamically. The interception module is thus adapted to selectively redirect memory allocations from low memory to high memory by intercepting calls to the DosAllocMem and the DosAllocSharedMem methods exposed by DOSCALL1. (For simplicity, the description only mentions DosAllocMem) It will be seen, however, that the interception module can be extended to intercept calls to any method exposed by DOSCALL1 or any other DLL and to manipulate these as required.

In the case of the interception module intercepting memory allocation calls, each line of a potentially multi-line configuration file is divided as follows:
1. Process name
2. Allocating module name
3. Allocation size range
4. Type of memory: Named, Giveable, Gettable, Private. (A terminal asterisk signifies a generic match on name).
5. Action to be taken: FORCE-HI, FORCE-LO or LEAVE.

with each field being comma delimited, as in the following example:
,INOTES,0xf0000-0xffffffff,
NAMED=\SHAREMEM\NOTESMEM*,FORCE-HI If a field is omitted, as in the case of Process Name above, then it is assumed to be a nonspecific match criterion. In the example configuration line above, it is specified that any process which runs a module called INOTES and that makes named shared allocations with a name beginning \SHAREMEM\NOTESMEM will have the OBJ_ANY flag forced on by the interception module to request preferential memory allocation from high memory.

As mentioned above, in order to enter the kernel using a 32-bit call from an application, it is required that this call is indirected via DOSCALL1. DOSCALL1 provides the calling application with a regular near32 C-calling convention call. The kernel is entered using a far32 call using an Intel CallGate since a privilege level switch is required. Thus, in DOSCALL1 the instruction used to enter the kernel will be of the form:
call selector:32-bit offset
Encoded in memory as hexadecimal digits, this will appear as:
9a xx xx xx xx yy yy
where x represents offset digits and y represents selector digits of the far32 call.

For each API call that is to be intercepted (in the present embodiment only one type of call is intercepted), the second instance of the activation module redirects the API calls to the interception module by creating R/W aliases to the entry points in DOSCALL1 and changing the far32 pointers to point to the interception module entry points. An alias is merely a region of virtual memory that maps to the same physical memory as the original memory object (in this case the location of the DosAllocMem far32 pointer address) by referencing the same physical address in its page table entry. If the memory is in a global shared region of virtual memory, then any update made to a memory object using the alias address will at the same time be made for all processes at the original address location. Since the access rights are also determined from the page table entry it is possible for the alias to have different access rights to the original memory object.

Under OS/2, aliasing is achieved by calling the DosAliasMem API. DosAliasMem provides a writable alias to the location in memory where the far call operands are stored in DOSCALL1. The interception module then writes the interception module's entry point expressed as a far32 address to this alias location and so replaces the operand values (x and y values) of the original far call instruction in physical memory with those of the interception module.

It should be noted that because the activation module needs to change 6 bytes of memory, it should take into account two additional things:

1. that the aliased instruction may cross a (4K) page boundary. As such, both the current and adjacent page need to be aliased; and
2. that the activation module does not get interrupted while making the call to DosAliasMem and writing the contents of the alias location(s), which is far from being an atomic operation. To achieve this, the activation module should: ensure that only one processor is running work if on, for example, an SMP system; disable interrupts; and finally read all memory locations that need to be written to before writing. This is done to minimize the possibility of a page fault occurring during the updating of the instructions in DOSCALL1.

The first two instances of the activation module have been broadly described above, however, there may in fact be three instances of the activation module:
1. First instance executed at system initialization time from CONFIG.SYS. This instance need only persist while the second instance parses configuration data and hooks system APIs. Once the second instance signals (through a communications buffer) that this has been completed, then the first instance can terminate and allow the remaining commands of CONFIG.SYS to execute.
2. Second instance executed as a daemon process by the first instance. The second instance remains resident until instructed to terminate by a third instance.
3. Third and subsequent instances are invoked directly from the command line by the user. They perform statistics reporting and signal the second instance to terminate in cases where the user wishes to alter the configuration data.

Each instance determines which instance it is and thus how it should perform by testing for the existence of named semaphores created by earlier instances. Named semaphores are system-wide unique objects, which may be created once but accessed multiple times. The second instance creates a so called termination semaphore; and the first instance, creates a communications semaphore. On instantiation, the activation module tries to open the (second instance's) termination semaphore, if successful it knows it is a third instance invocation. If not, then it tries to open the (first instance's) communications semaphore. If successful, it knows it is the second instance invocation, so performs its initialization tasks and creates its termination semaphore. If opening the communications semaphore is unsuccessful then first instance invocation is assumed, whereupon the communications semaphore is created and second instance launched.

Alternatively, the activation module could first try to open the termination semaphore and if that succeeds, it assumes it is a third instance, otherwise it creates the communications semaphore. If that succeeds, it assumes it is a first instance, otherwise it assumes it is a second instance. This means that the first instance creates the communications semaphore at the beginning of its processing, while the second instance can create the termination semaphore at the end of its processing after completing other necessary tasks. Making the tests in this way avoids pathological problems caused by timing circumstances.

In any case, either scheme allows the first instance to terminate as well as allowing the second and subsequent instances to identify their instantiation hierarchy.

To make communication between instances of the activation module easy and to avoid recursion complications with minimal performance overhead, the activation module specifies a shared R/W segment, which is used as a communications buffer. The R/W private segment is shared by virtue of the fact that it is mapped to common physical memory. Access to the buffer uses a compare-and-exchange technique on a flag field prefix to the buffer. The flag prefix acts as a command directive to the first instance of the activation module which performs one of the following operations based on the prefix: a) wait for a change in prefix; b) print a message and wait for a new prefix; c) print a message and terminate; d) print a message and terminate with error.

Turning now to the operation of the interception module. This performs the following tasks:

conditionally modifies parameters to the original DOS-CALL1 API calls. In the present embodiment, calls to DosAllocMem are altered according to the configuration data supplied by the activation module; and calls the original kernel entry points.

It will be seen that in order to be able to call the original kernel entry points, the interception module must be able to remember the original API call address. When a DLL is loaded by a calling process such as the activation module, it comprises three portions in memory: a code segment common to all calling processes; an instance data segment; and a global data segment. Data stored in an instance's instance data segment is essentially inaccessible to other instances of the DLL. Plural instances of the DLL can on the other hand share information via the global data segment. However, the global data segment does not become accessible to the DLL unless it is formally loaded by a process. Processes making API calls which the interception module is adapted to intercept will not be aware of its presence and so do not formally load the interception module. So, in the preferred embodiment of the invention, the interception module formally loads itself to make information accessible across all instances of the interception module.

As will be explained later, however, it is not necessarily desirable for the interception module to immediately formally load itself whenever it is called as a result of a third party process call to DOSCALL1 or in particular if it is called directly from DOSCALL1. The interception module may on the other hand wish to allow the API to proceed as normal to the kernel. Without access to some form of data available to all instances of the interception module, however, it would be extremely difficult to provide this information, in particular, to instances of the interception module called from third party processes.

In order to overcome this problem, one or more predetermined interception module global variables are used to store the original kernel entry point(s). The code segment, however, is read-only, and so the interception module exports these variables to the activation module (this happens automatically when the interception module is implicitly loaded by the activation module when OS performs a process known a fixing-up where external references are resolved) and the second instance of the activation module creates an alias to the location of these interception module variables and populates this alias with the address of the kernel entry point(s) which are intercepted by the interception module. Thus, the second instance of the activation module is able to store the original kernel entry point addresses in a read/write alias available to all instances of the interception module code segment before modifying operands of the call instructions in DOSCALL1. Location of these global variables in the interception module code segment instead of the data segment permits the interception module to call the original kernel entry points before being formally loaded should any of tests made on entry to the interception module fail. This incidentally allows the third instance of the activation module to deactivate the API hooks by restoring the call instruction operands in DOS-CALL1 from the exported global variables saved in the interception module's code segment alias.

Nonetheless, in order to process the configuration data, accumulate statistics, make C run-time library and API calls and most importantly serialize access to the configuration data, the interception module uses the global data segment. A DLL's data segments are not made available to a process until the DLL is loaded by that process. Only the code is accessible, adventitiously, if it happens to be loaded into the GSR. Using initialization techniques described earlier for the activation module the interception module is guaranteed to be loaded into the GSR by the activation module. To load the interception module in any other process only requires therefore that the interception module load itself using DosLoadModule. (As will be explained below, this should only be done after stack and recursion checks have been made.) In any case, once DosLoadModule has been called by the interception module it acquires the status of a loaded DLL in the process which is unwittingly calling the interception module through having the DOSCALL1 APIs hooked.

As mentioned above, the interception module should check if it is being called from DOSCALL1 before formally loading itself In OS/2, a call to DosQueryModuleFromEIP tells the interception module if the calling module is DOS-CALL1. This is useful because it is possible that the interception module itself may make calls to DOSCALL1, and there would therefore be a danger of recursion if the interception module continued its processing. So, by only proceeding if the calling module is not DOSCALL1, the possibility of recursion is eliminated. This also avoids a further potential problem—during process initialization and the execution of some system APIs in DOSCALL1, the system makes use of temporary stacks which prohibit the registration of exception handlers. As explained below, in the preferred embodiment, the interception module uses exception handlers to obtain configuration data and so this would prevent the interception module obtaining the information it needed to modify (or not) an API call.

This simple check is a particularly good way to avoid recursing through the interception module, because, as explained above, until a module becomes a formally loaded module in the process in which it is executing, it has no global or instance data in which to record state and variables. It can only use local data, i.e. stack-based data, where it is difficult for other instances of even the same module locate data.

As mentioned above, the interception module of the preferred embodiment also carries out checks on the system stack before loading itself The system records information about the original stack in the thread information block (TIB), which is available for use by the application. The interception module accesses the TIB for the current thread and compares the extended stack pointer (ESP) register with the stack pointer and size. In addition the interception module checks that the current stack corresponds to the originally allocated stack. This tells the interception module whether the original application is a 32-bit application or if, for example, the calling process is a 16-bit application switched to 32-bit code and a 32-bit stack. In this case, where the API call being intercepted is DosAllocMem, it would be undesirable to intercept and alter memory allocation parameters because of the need to retain 16/32-bit addressing compatibility, as it can be said with near certainty that a 16-bit application will not wish to have its memory allocations forced high since there is a strong chance they will be accessed by 16-bit code and so this possibility is disallowed. This check simplifies configuration information by obviating the need to code multiple exceptional cases into the configuration file where API modification should not be done.

So, once the interception module has made the above checks and has determined that it is free to load itself, it needs to obtain access to the configuration data supplied by the activation module. In order to serialize access to the configuration data, the interception module implements its own multiple-read, single-write non-recursive spin lock package. The spin lock mechanism is non-reentrant, shared and exclusive and can be used by C and Assembler language code, of which the embodiment of this invention is a mixture of both. The spin lock mechanism, which is well known, essentially involves a memory location within the interception module global data segment, FIG. 3, that is set to zero to indicate write access allowed and nonzero to indicate write access prohibited. Acquiring a spin lock involves looping while testing the spin lock to become zero. The test and update must be accomplished using an atomic instruction. All processor platforms that support multiprocessing provide such instructions for this purpose, for example, the Compare and Exchange instruction on Intel. This allows multiple read accesses to the configuration data and exclusive write access and allows the interception module to be multiprocessor safe with minimal performance overheads.

To access the configuration data, the interception module uses DosGetSharedMem, and to do that efficiently, the interception module activates an exception handler that attempts to access the configuration data. While this can be done on every call to the interception module, a performance advantage is gained by doing this only once in each process that formally loads the interception module. This is achieved, as described below, by using an exception handler to intercept an access violation on a first attempted access from which a call DosGetSharedMem is made. An exception handler is a subroutine, registered with the operating system, that is given control whenever a potentially fatal exception occurs under the thread on which the handler is registered. For example, a page fault exception generated by the processor when memory access is attempted to a location for which the present flag is not set in the corresponding page table entry for that virtual memory location. If the interception module page faults (that is generates a page fault exception because the page table entry for this address does not have the present flag set) then the exception handler is invoked and the interception module calls DosGetSharedMem from there. (The effect of DosGetSharedMem is to cause the page table entries that give access to the shared data to be built for the calling process).

Figure 4A:
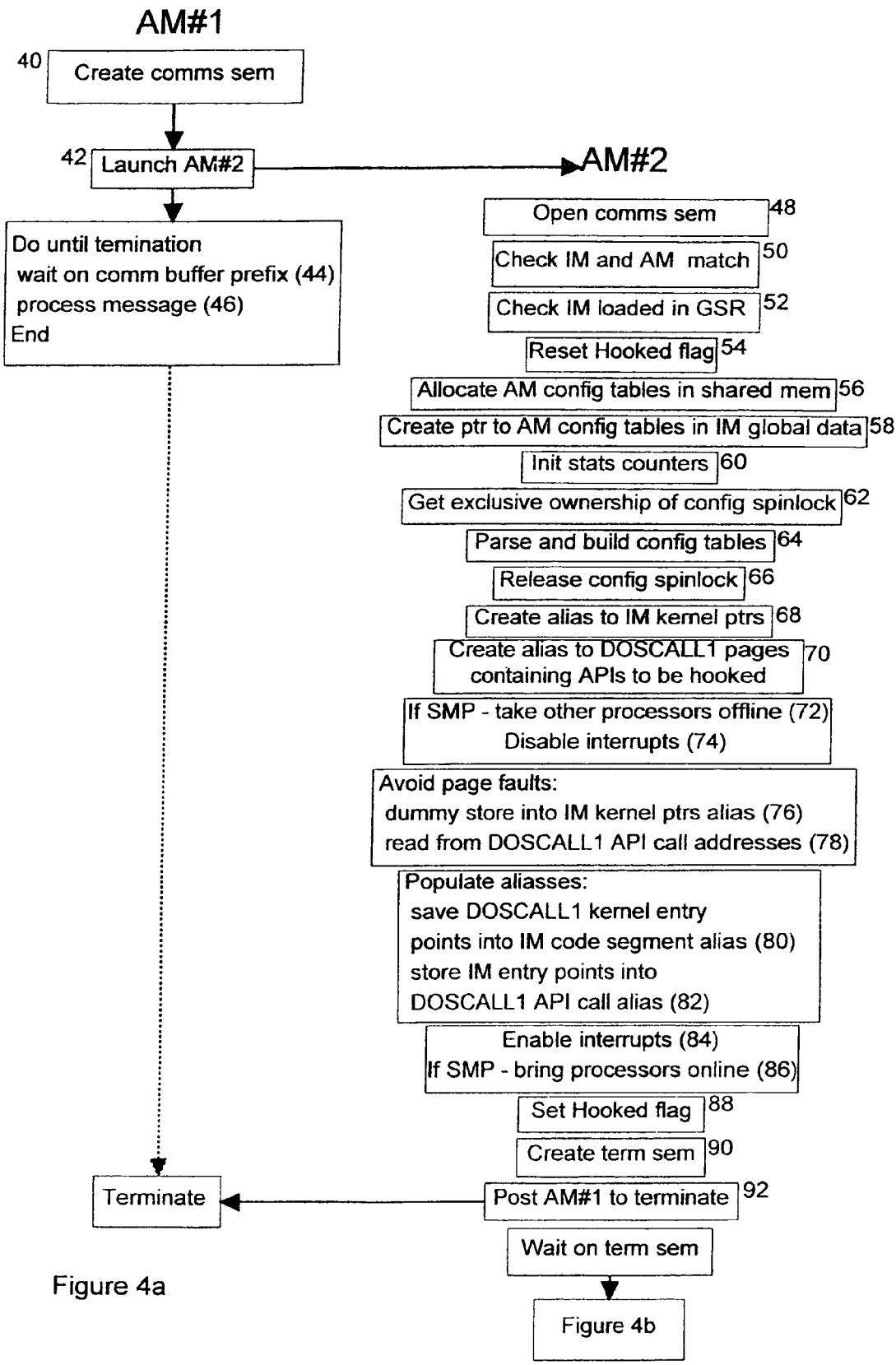
FIGS. 4a, 4b and 5 are flow diagrams illustrating the operation of instances of the activation module and the interception module of FIG. 3.
Figures 4B, 5:
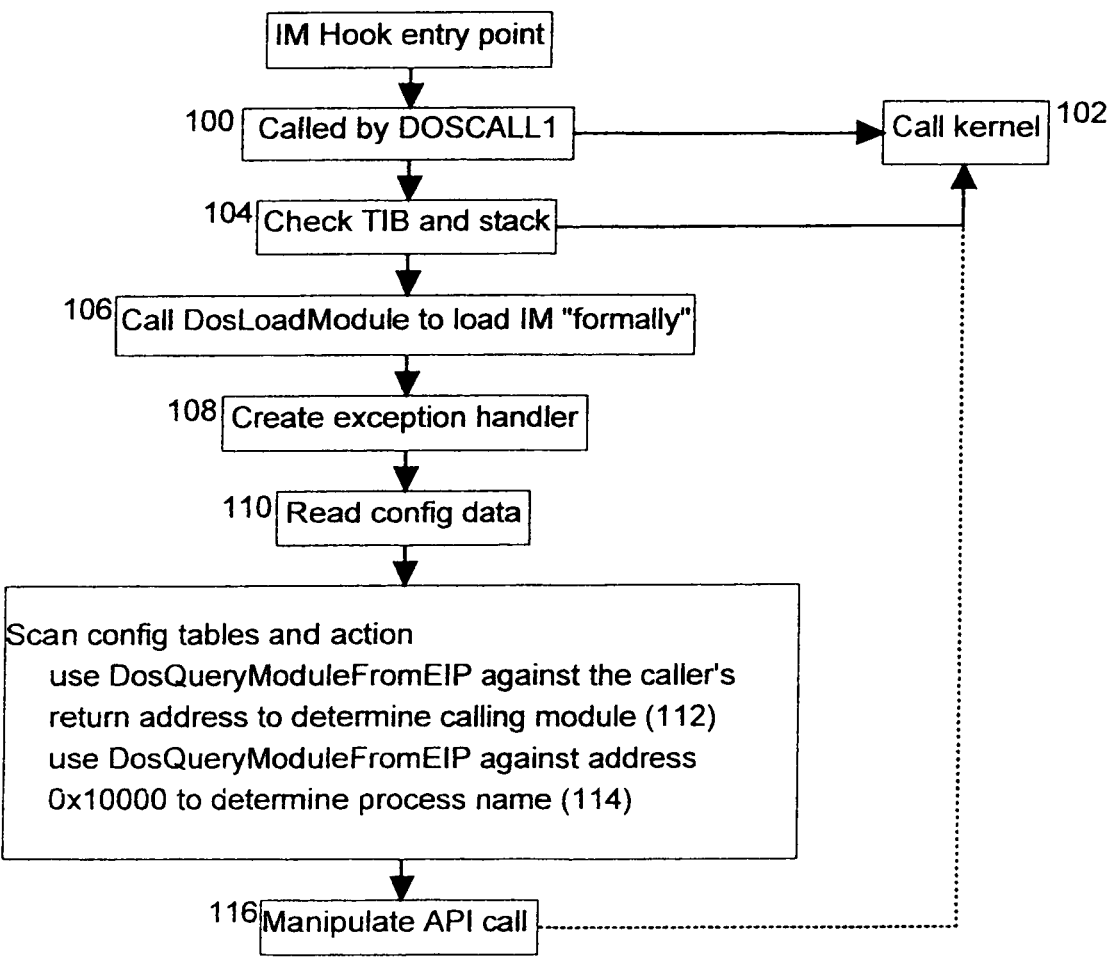

So having dealt with the considerations behind the implementation of the preferred embodiment, FIGS. 4 and 5 illustrate the operation of the embodiment:

To begin, the first instance of the activation module, having determined it is such, sets the communications semaphore, step 40, FIG. 4a. The first instance then launches the second instance, step 42 and then simply waits on changes to the communications buffer prefix, step 44. Whenever such a message arrives, for example, AM#2 saying it has hooked the API successfully, it is displayed for the end user, step 46. In the meantime, the second instance determines it is such by successfully opening the communications semaphore, step 48. It then makes some basic checks to determine for example, that the versions of interception module and activation module are compatible, step 50, and that the interception module is indeed loaded in the global shared region, step 52. If this is not the case, a message can be sent to the user via the first instance of the activation module. The interception module and its global data segment are of course available to the activation module and as such it is able to store a "hooked" flag in the global data segment, which is initially reset, step 54.

A named area of low shared memory "AM Config", FIG. 3, is then allocated, step 56, and the activation module writes a pointer to this area in the interception module global data segment, step 58, thus making this information available to any formally loaded instance of the interception module. The activation module then initializes some statistical counters, again within the interception module global data segment, step 60, and these can be reported at any stage to, for example, third and subsequent instances of the activation module. The activation module then acquires the configuration data spin lock, step 62, again stored in the interception module global data segment, writes configuration data read from the configuration file to AM Config, step 64, and releases the spin lock, step 66.

The activation module now begins the process of hooking the API calls that are to be intercepted. It first aliases the variable within the interception module which is to store the original kernel entry point, step 68, and then aliases the pages within DOSCALL1 which contain the addresses of the kernel entry points for the API calls to be intercepted, step 70. Then, for reasons explained above, other processors are taken off-line and interrupts disabled, steps 72 and 74. Then to avoid page faults, the activation module performs a dummy store into interception module original kernel entry point alias and performs a read from the DOSCALL1 API call instruction addresses, steps 76 and 78. Then the actual hooking takes place, when the activation module saves the DOSCALL1 API call kernel entry point into the interception module code segment alias and stores the interception module entry point into the corresponding DOSCALL1 API call instruction alias, step 80 and 82. Once complete, interrupts are re-enabled, multiprocessors are brought back online and the hooked flag is set, steps 84 to 88.

Once the hooked flag is set, the activation module can now create the termination semaphore, step 90, and subsequently indicate to the first instance of the activation module via the communications buffer that it can terminate, step 92. The second instance now remains in memory simply waiting for an instruction to unhook the interception module. To unhook the interception module, steps 72 to 88 are simply reversed with the API call addresses stored in the interception module aliases being written back into the DOSCALL1 aliases, FIG. 4b.

While hooked, the interception module operates as shown in FIG. 5. When called, the module first determines if it is being called from DOSCALL1, step 100. If so, then the original kernel entry point is called, step 102. If not, then the TIB and stack are checked as described above to determine if the calling application is a 32-bit application, step 104. If not, the original kernel entry point is called, step 102. Otherwise the module proceeds to formally load itself, step 106. This gives access to statistical variables, the hooked flag, the configuration data spin lock, the pointer to the configuration data etc. It also allows APIs and run-time routines that require the calling process to use instance and global data to be called by the interception module. The exception handler is then created, step 108, and, if an exception is created, configuration data is made accessible by calling DosGetSharedMem, step 110.

In the present case, the interception module again uses DosQueryModuleFromEIP to determine the calling module and the calling process's name, steps 112 and 114. Use DosQueryModuleFromEIP against address 0x10000 to determine process name, works because all process's executables are loaded at 0x10000. If this ever changes the process's name could be determined by a number of alternative means.

If the process name and calling module match the criteria set in the configuration data, then the appropriate manipulation of the API call is carried out by the interception module, and if necessary the kernel is called, steps 116 and 102.

Finally, it should be noted that if the kernel is called, as in the case of intercepted DosAllocMem API calls, the kernel always returns directly to original calling process.

In summary, the preferred embodiment deals with many problems associated with intercepting API calls, particularly in a multiprocessor virtual memory system.

By having the interception module make a couple of checks and then load itself using DosLoadModule, an API normally used for loading DLLs other than oneself, the interception module becomes loaded in all address spaces so making the alteration of the intercepted API call for all calling processes.

Again, having the interception module load itself enables each instance of the module to receive common information from the activation module including configuration information. It also enables the interception module to set up a spin lock common to all instances of the module thus enabling access to the interception module's configuration information to be serialized.

Using two instances of the activation module enables communication with the user and yet allows the activation module to run as a daemon process and so maintain the interception module in memory. The communication/termination semaphore mechanism enabling instances of the activation module to identify themselves in turn allows a third instance to disable interception, possibly reconfigure and then re-enable interception dynamically.

It should be noted that all code and data segments of an executable module are loaded into or allocated from a private area. Normally code as well as read-only data segments have a read-only attribute and so they acquire the additional attribute of shared. Read/write data segments are normally used for data which is private to a particular instance of a process and hence acquire the additional default attribute private. The shared attribute instructs the operating system to make all instances of a memory object use the same physical memory. However, the private attribute causes a separate areas of physical memory to be mapped to each instance of the memory object.

The attributes of a module's segments may be specified explicitly as parameters to a linkage editor when the module is compiled. By specifying explicitly that a read/write segment of the activation module be shared guarantees that a common read/write area is automatically created when the first instance of a module is loaded and subsequent instances will share the existing instance. This avoids the ramifications of using memory allocation APIs explicitly which this code is in the process of altering.

It should be seen that while the preferred embodiment has been described in terms of the OS/2 operating system, the invention is not necessarily limited to this particular system. As explained above, neither is the invention limited to altering the operation of the DosAllocMem API call, and is equally adapted to intercept any other API call.

What is claimed is:

1. A system for intercepting one or more application program interface (API) calls in a virtual memory environment comprising: an activation module and an interception module:
   said activation module being adapted to load said interception module to occupy a location in a shared region of virtual memory as long as interception of said API calls is required;
   said activation module being adapted to redirect said one or more API calls by creating an alias to any page containing an entry point for an API call to be intercepted and to write the address of said interception module to said alias;
   said activation module being adapted to provide to any instances of said interception module the original entry points for said one or more API calls; and
   said interception module being adapted to selectively provide modified functionality for said intercepted API calls.

2. A system as claimed in claim 1 wherein said activation module is adapted to load said interception module at system initialization time.

3. A system as claimed in claim 1 wherein said activation module is adapted to read a configuration file containing data defining the API calls to be intercepted and the manner in which said API calls are to be modified, said activation module being adapted to write said configuration data to an area of shared memory and to provide to all instances of said interception module the location of said shared memory.

4. A system as claimed in claim 3 wherein an instance of said interception module is responsive to receiving a redirected API call to load itself within the process making said API call so that a segment of global data is made available to each instance of said interception module.

5. A system as claimed in claim 4 wherein said activation module is adapted to write the location of said shared memory to said global data segment and wherein any instance of said interception module is adapted to use said location to read said configuration data from shared memory.

6. A system as claimed in claim 1 wherein said interception module is adapted to export one or more global variables located in its code segment to said activation module, each global variable corresponding to an API call to be intercepted, said activation module being adapted to create an alias to any page containing one of said one or more global variables to write the original entry point of said one or more API calls to said respective aliases.

7. A system as claimed in claim 1 wherein said activation module is adapted to operate in at least two modes, an instance running in a first mode being adapted to instantiate an instance to run in a second mode wherein said instance running in said second mode runs as a daemon so maintaining said interception module in virtual memory.

8. A system as claimed in claim 7 wherein each instance of said activation module is adapted to intercommunicate through a shared read/write communications segment.

9. A system as claimed in claim 5 wherein said interception module is adapted to utilize a spin lock variable located in said global data segment to serialize access to said configuration data.

10. A system as claimed in claim 5 wherein said interception module is adapted to use an exception handler to access said configuration data.

11. A system as claimed in claim 4 wherein said interception module is adapted to check that it is not being called recursively prior to loading itself.

12. A system as claimed in claim 1 wherein one of said one or more API calls to be intercepted is a call for allocating memory.

13. A system as claimed in claim 1 wherein said activation module and said interception module are adapted to operate on OS/2 Warp Version 3 SMP and Warp Version 4.5 operating systems.

14. A computer program product comprising computer program code stored on a computer readable storage medium for intercepting API calls when executed on a virtual memory computer system, the program code comprising an interception module code and an activation module,
- said activation module being adapted to load said interception module to occupy a location in a shared region of virtual memory as long as interception of said API calls is required;
- said activation module being adapted to redirect said one or more API calls by creating an alias to any page containing an entry point for an API call to be intercepted and to write the address of said interception module to said alias;
- said activation module being adapted to provide to any instances of said interception module the original entry points for said one or more API calls; and
- said interception module being adapted to selectively provide modified functionality for said intercepted API calls.

15. A computer program product as claimed in claim 14 wherein said activation module is adapted to read a configuration file containing data defining the API calls to be intercepted and the manner in which said API calls are to be modified, said activation module being adapted to write said configuration data to an area of shared memory and to provide to all instances of said interception module the location of said shared memory.

16. A computer program product as claimed in claim 15 wherein an instance of said interception module is responsive to receiving a redirected API call to load itself within the process making said API call so that a segment of global data is made available to each instance of said interception module.

17. A computer program product as claimed in claim 16 wherein said activation module is adapted to write the location of said shared memory to said global data segment and wherein any instance of said interception module is adapted to use said location to read said configuration data from shared memory.

18. A computer program product as claimed in claim 14 wherein said interception module is adapted to export one or more global variables located in its code segment to said activation module, each global variable corresponding to an API call to be intercepted, said activation module being adapted to create an alias to any page containing one of said one or more global variables to write the original entry point of said one or more API calls to said respective aliases.

19. A computer program product as claimed in claim 14 wherein said activation module is adapted to operate in at least two modes, an instance running in a first mode being adapted to instantiate an instance to run in a second mode wherein said instance running in said second mode runs as a daemon so maintaining said interception module in virtual memory.

* * * * *